United States Patent [19]

Wen

[11] Patent Number: 5,170,585
[45] Date of Patent: Dec. 15, 1992

[54] AUTOMATIC DOOR ASSEMBLY

[76] Inventor: Ching-Sun Wen, No. 1, Hsi-Jiunn Lane, Nei-Pu Hsiang, Pingtung Hsien, Taiwan

[21] Appl. No.: 802,349

[22] Filed: Dec. 4, 1991

[51] Int. Cl.$^5$ .............................................. E05F 11/00
[52] U.S. Cl. .......................................... 49/358; 49/360
[58] Field of Search ................... 49/358, 25, 139, 360

[56] References Cited

U.S. PATENT DOCUMENTS

| | | | |
|---|---|---|---|
| 3,606,699 | 9/1969 | Robinson, Jr. | 49/358 X |
| 3,775,906 | 12/1973 | Dougherty | 49/358 |
| 4,541,202 | 9/1985 | Dockery | 49/139 X |
| 4,658,543 | 4/1987 | Carr | 49/139 |
| 4,750,294 | 6/1988 | Lafontaine | 49/358 X |
| 4,858,383 | 8/1989 | Kendig | 49/360 |
| 4,916,860 | 4/1990 | Richmond et al. | 49/358 X |

*Primary Examiner*—Philip C. Kannan
*Attorney, Agent, or Firm*—Ladas & Parry

[57] ABSTRACT

The automatic door assembly includes a rail, a door carriage movably provided on the rail, a driving unit for moving the door carriage, a rechargeable battery unit for supplying electric power to operate the driving unit and a circuit for electrically connecting the rechargeable battery unit and the driving unit. It also has a charging unit for timely charging of the rechargeable battery unit and a device for stopping the door carriage automatically at the open and closed positions.

2 Claims, 4 Drawing Sheets

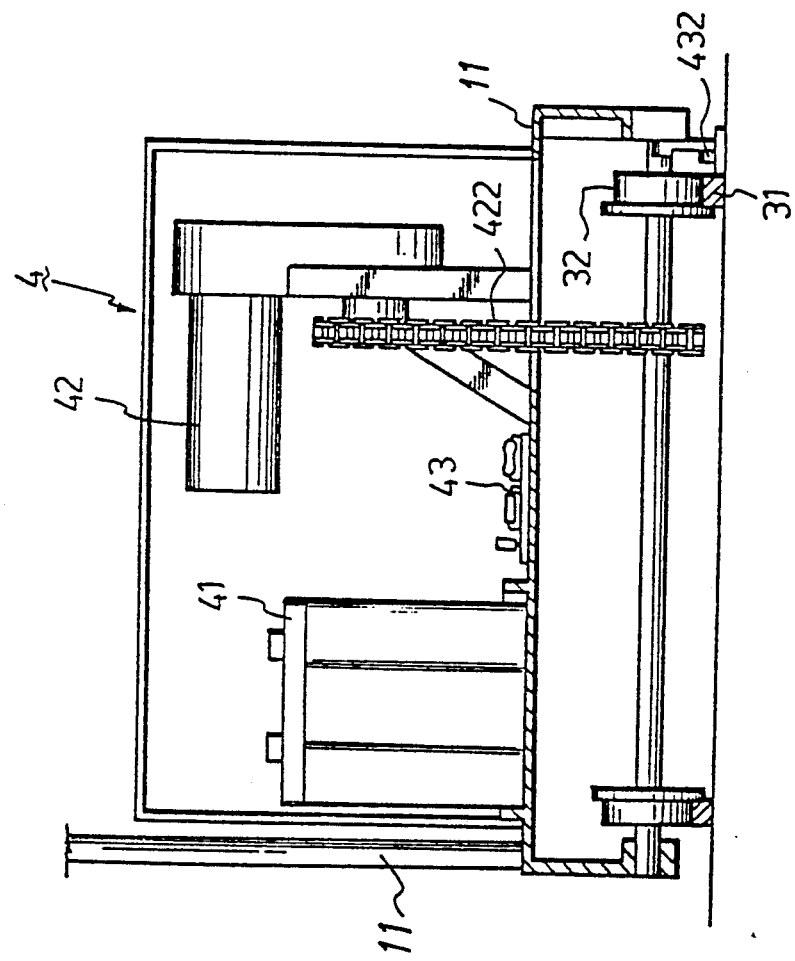

AUTOMATIC DOOR ASSEMBLY

BACKGROUND OF THE INVENTION

1. Field of Invention

This invention relates to an automatic door, more particularly to one which is driven by a moving device operated by a rechargeable battery means so that said automatic door can be operated even when the domestic current is cut off.

2. Description of the Related Art

Referring to FIG. 1, a conventional automatic door is shown to comprise a door carriage (1) movably provided on a rail (3) and a driving means, such as a motor (2), for electrically moving said door carriage to a closed or open position. It has been found that such an automatic door carriage (1) can not be moved once the domestic current is cut off, causing the user much inconvenience. To move it manually is impossible since such a door carriage is generally very large in size.

SUMMARY OF THE INVENTION

It is therefore a main object of the present invention to provide an automatic door which is driven by a moving means operated by a rechargeable battery means so that said automatic door can be moved even though the domestic current is cut off.

According to the present invention, the automatic door includes a rail and a door carriage movably provided on the rail, a driving means for moving the door carriage along the rail, a rechargeable battery means for supplying electric power to operate the driving means, a circuit for connecting and disconnecting the rechargeable battery means to the driving means and a stopping means for automatically stopping the door carriage upon reaching the closed and open positions. A control switch, when operated, can order the driving means to move the door carriage to an open position or a closed position. The control switch includes a charging means for timely charging of the rechargeable battery means in order to keep it fully charged so that such an automatic door can be operated even when the domestic current is cut off.

BRIEF DESCRIPTION OF THE DRAWINGS

Other feature and advantages of the present invention will become more apparent in the following description, including the drawings, all of which show a nonlimiting form of the present invention, and of which:

FIG. (1) shows an automatic door of the prior art.

Figure 1:
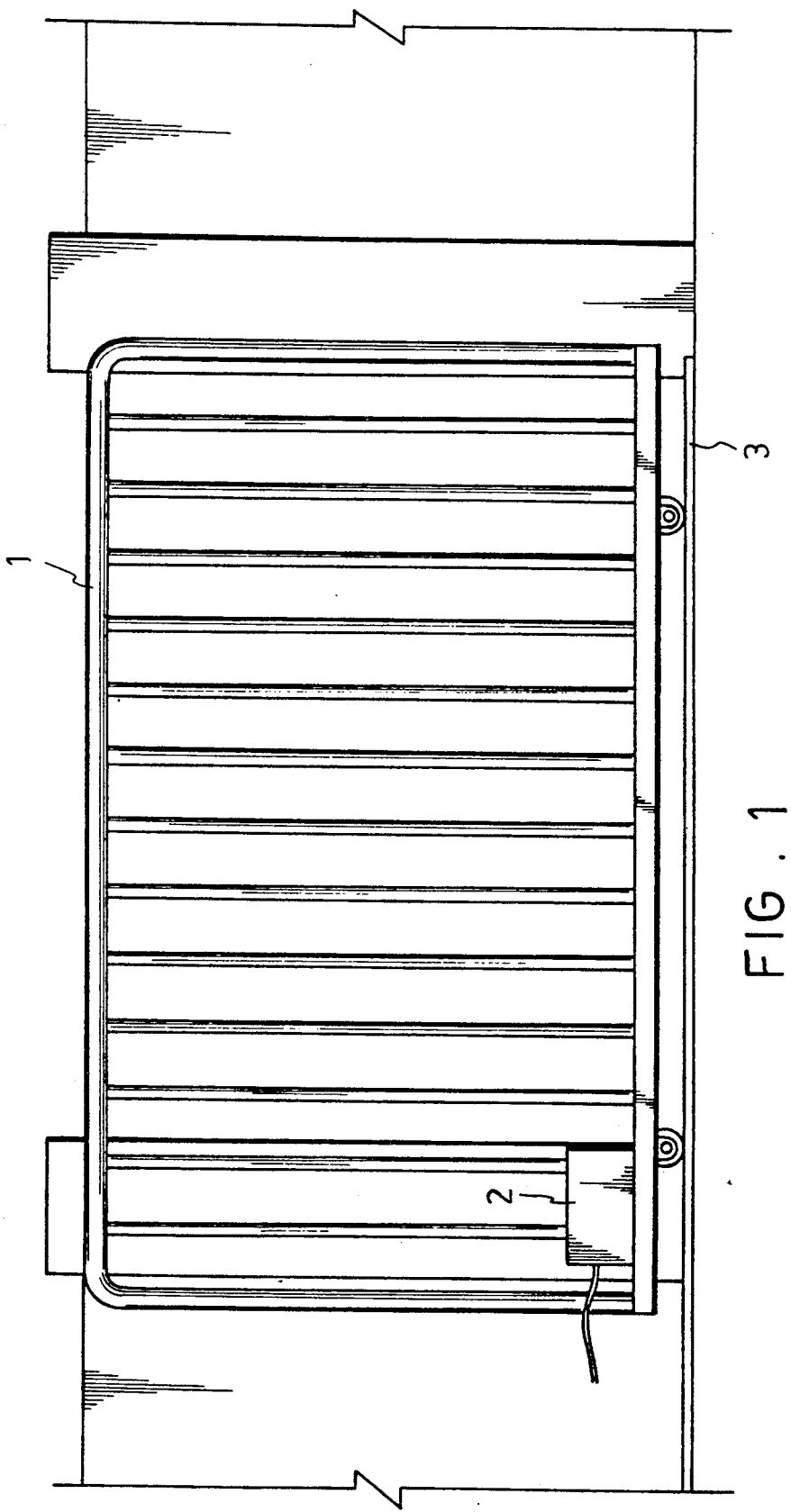
Figure 2:
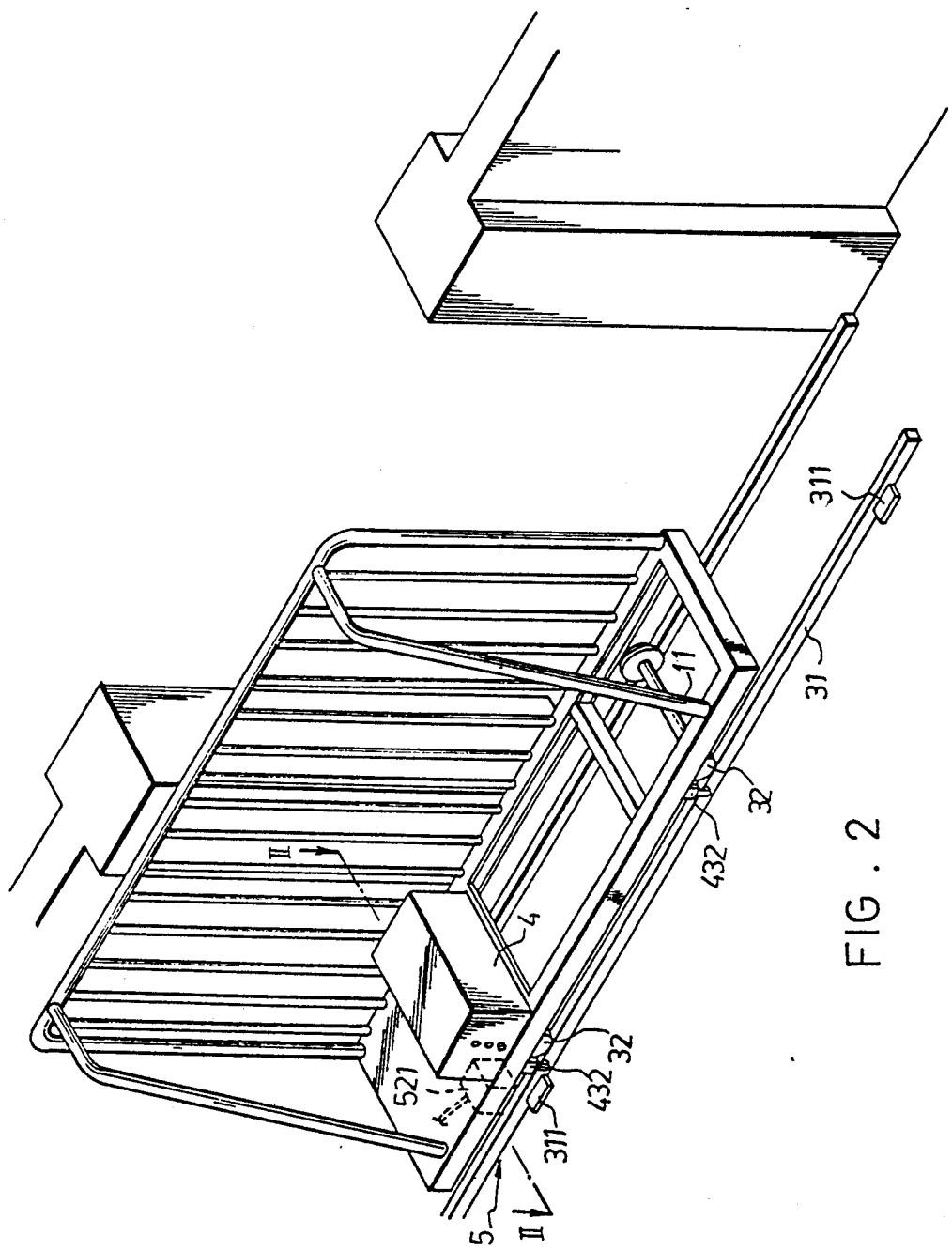
Figure 3:
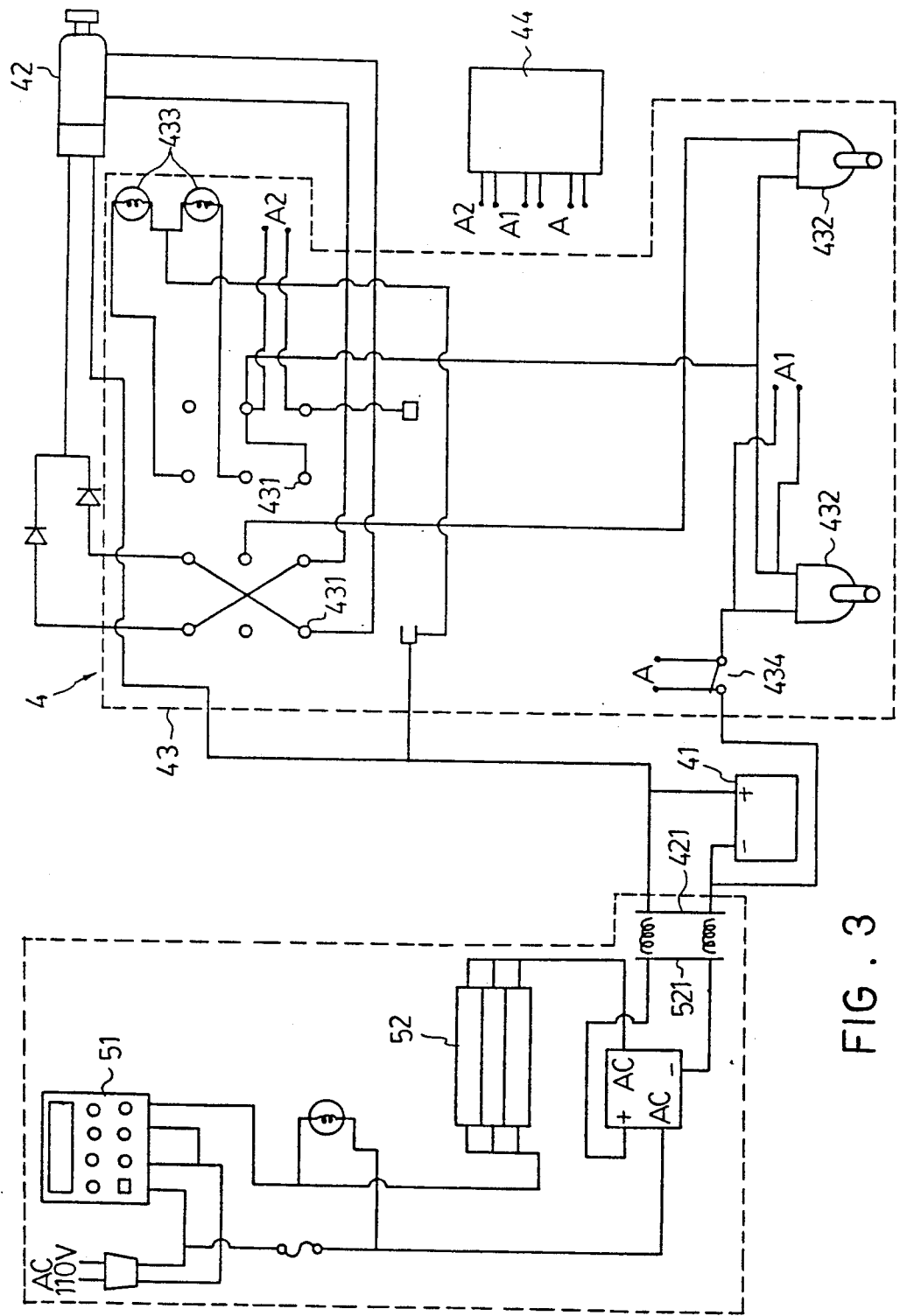

FIG. (2) shows an automatic door of the present invention.

FIG. (3) shows a block diagram of a circuit and a charging device of the automatic door of FIG. (2).

FIG. (4) shows a cross sectional view of FIG. (2) taken along the line II—II.

DETAILED DESCRIPTION OF THE PREFERRED EMBODIMENT

Referring to FIG. (2), an automatic door of the present invention includes a rail (31), a door carriage (11) movably provided on the rail (31), a control unit (4) provided on the door carriage (11) and a charging means (5) provided adjacent to the control unit (4).

It is to be understood that the control unit includes a rechargeable battery unit (41), a driving unit (42), such as a motor, the operation power for which is supplied by the rechargeable battery unit (41), and a circuit (43) which connects the rechargeable battery unit to the driving unit (42). The circuit (43) includes a breaker (431) which disconnects the rechargeable battery unit (41) to the driving unit (42) upon detection that a current passing through the circuit (43) exceeds a predetermined load, a micro switch with two terminals (432) separately placed at predetermined position on the door carriage (3) and two switch actuators (311) separately placed on the rail (31) and an indicating bult (433) which shows in which direction the door carriage (11) is moved.

The driving unit (42) is connected to the wheels (32) of the door carriage (11) by means of a gear assembly (422) as shown in FIG. (4). In the present preferred embodiment, the gear assembly (422) is meshed with the rear wheels of the door carriage (11). The charging means (5) includes a timer (51) and a charging unit (52) having a first electrode (521) provided at a free end of the rail (31). The rechargeable battery means (41) also has a second electrode (421). The timer can be set in such a way that the charging unit can charge the rechargeable battery unit at preset times. The configuration of the charging unit (52) is known in the art. The charging means (5) is arranged on the rail (31) adjacent to one end of the latter so as to charge the rechargeable battery means (41) whenever the door carriage (11) is at the open or closed position.

Referring to FIG. (3), the main switch (434) can be actuated by a conventional switch or a remote control switch (44). In the preferred embodiment, the door carriage (11) is actuated by the remote control switch (44). When the remote control (44) is pushed to (A1) from the intermediate position (A), the main switch (434) connects the circuit (43), and the rechargeable battery unit (41) supplies electric power to the driving unit (42) to move the door carriage (11) along the rail (31) to the right to a closed position. Upon reaching a predetermined position, the micro switch terminal (432) is actuated by the switch actuator (311) so that the door carriage comes to a standstill, i.e., a closed position. When the remote control switch is pushed to (A2), the door carriage (11) moves to the left to another predetermined position, where upon the micro switch (432) is actuated by another switch actuator (311), and the door carriage is at an open position. The indicating bulb (433) shows the direction of the movement of the door carriage (11). At that time, the electrode ends (521,421) of the charging means (5) and the rechargeable battery unit meet, charging the rechargeable battery unit (41). Of course, the charging means (5) is electrically connected to a main power source, such as 110 V main switch installed in a house. Thus the rechargeable battery unit is always kept charged, so that the door carriage (11) can be moved even when the main switch is cut off due to some reasons. This is the most distinguished feature of the present invention.

The provision of the circuit enables the door carriage to be operated by a remote control switch which door carriage automatically stops at the closed or open position. In the conventional door, however, must wait until the door carriage reaches a closed or open position. This is the second distinct feature of the present invention.

With the invention thus explained, it is obvious to those skilled in the art that various modifications and variations can be made without departing from the scope and spirit of the present invention. It is therefore intended that this invention be limited only as in the appended claims.

I claim:

1. An automatic door for closing an opening in a fence structure, said automatic door comprising:
    a rail means being disposed on the ground surface and extending across said opening;
    a door carriage being movably provided on said rail means;
    a control means being provided on said door carriage and including a driving means for moving said door carriage along said rail means between a first position, wherein said door carriage closes said opening in said fence structure, and a second position, wherein said door carriage permits passage through said opening, a rechargeable battery means for supplying electrical power to said driving means, and a control switch means being operable so as to connect selectively said driving means and said rechargeable battery means in order to control movement of said door carriage;
    a battery charging unit for timely charging said rechargeable battery means; and
    means for stopping said door carriage at said first and second positions;
    wherein said battery charging unit is mounted on and disposed adjacent to one end of said rail means, said battery charging unit including a charging circuit and a first electrode means electrically connected to output terminals of said charging circuit; and
    wherein said control means further comprises a second electrode means electrically connected to said rechargeable battery means, the second electrode means being aligned with and facing the first electrode means, the second electrode means contacting the first electrode means so as to permit said charging circuit to charge said rechargeable battery means when said door carriage is in one of the first and second positions.

2. An automatic door as claimed in claim 1, wherein said control means further comprises a breaker which disconnects said rechargeable battery means from said driving means when a current passing through said control means exceeds a predetermined load, a main switch which receives a signal from said control switch and an indicating bulb which shows whether said door carriage is moved toward said first or second position, and wherein said stopping means is a micro switch with two terminals separately placed on said door carriage and two switch actuators separately placed on said rail.

* * * * *